United States Patent
Miyazaki

(10) Patent No.: US 10,073,810 B2
(45) Date of Patent: Sep. 11, 2018

(54) PARALLEL PROCESSING DEVICE AND PARALLEL PROCESSING METHOD

(71) Applicant: FUJITSU LIMITED, Kawasaki-shi, Kanagawa (JP)

(72) Inventor: Kiyoshi Miyazaki, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 74 days.

(21) Appl. No.: 15/250,902

(22) Filed: Aug. 29, 2016

(65) Prior Publication Data
US 2017/0102954 A1  Apr. 13, 2017

(30) Foreign Application Priority Data
Oct. 7, 2015 (JP) .................................. 2015-199148

(51) Int. Cl.
G06F 9/00 (2006.01)
G06F 15/78 (2006.01)

(52) U.S. Cl.
CPC ............................... G06F 15/7889 (2013.01)

(58) Field of Classification Search
CPC .................................................. G06F 15/7889
USPC .......... 712/240, 35, 216; 707/713, 760, 764, 707/769; 718/1, 103, 100; 710/269
See application file for complete search history.

(56) References Cited

U.S. PATENT DOCUMENTS

| 6,950,927 B1* | 9/2005 | Apisdorf ............... G06F 9/3838 712/216 |
| 8,689,223 B2* | 4/2014 | Dadhich ............. G06F 11/3632 712/227 |
| 2006/0085582 A1 | 4/2006 | Shikano et al. |
| 2007/0124523 A1 | 5/2007 | Shimizu et al. |
| 2011/0055484 A1* | 3/2011 | Eichenberger ........ G06F 9/3814 711/125 |
| 2013/0346979 A1* | 12/2013 | Nightingale ............ G06F 8/456 718/100 |

(Continued)

FOREIGN PATENT DOCUMENTS

| JP | 2006-119802 | 5/2006 |
| JP | 2006-260377 | 9/2006 |

(Continued)

*Primary Examiner* — Aurel Prifti
(74) *Attorney, Agent, or Firm* — Westerman, Hattori, Daniels & Adrian, LLP

(57) ABSTRACT

A parallel processing device includes processors that execute respective processes and cause an FPGA circuit to process part of the processes. A first processor of the processors requests the FPGA to execute processing of part of a first process currently being executed, and transitions to a wait state of processing completion of the FPGA and, when the first processor initiates execution of a second process, the first processor sends movement-destination processor information to the FPGA, and also sends, to a movement-destination processor, environment setting information for the first process after completion in the FPGA. And the movement-destination processor performs setting of the environment setting information during the execution of the processing of the part of the first process by the FPGA circuit, and continues the processing of the first process in response to a processing completion notification from the FPGA circuit.

12 Claims, 14 Drawing Sheets

(56) References Cited

U.S. PATENT DOCUMENTS

| | | | |
|---|---|---|---|
| 2014/0019738 A1* | 1/2014 | Kataoka | G06F 9/30058 712/240 |
| 2014/0067845 A1* | 3/2014 | Asaad | G06F 17/30442 707/760 |
| 2014/0067851 A1* | 3/2014 | Asaad | G06F 17/30442 707/769 |
| 2014/0095468 A1* | 4/2014 | Aingaran | G06F 17/30501 707/713 |
| 2014/0215424 A1* | 7/2014 | Fine | G06F 17/5054 716/117 |
| 2014/0281169 A1* | 9/2014 | Mehrotra | G06F 12/0866 711/103 |
| 2015/0036942 A1* | 2/2015 | Smirnov | G06K 9/6282 382/227 |
| 2015/0052332 A1* | 2/2015 | Mortensen | G06F 15/7889 712/37 |
| 2015/0169328 A1* | 6/2015 | Gupta | G06F 9/3877 712/34 |
| 2015/0205644 A1* | 7/2015 | Ito | G06F 9/52 718/103 |
| 2016/0012107 A1* | 1/2016 | Asaad | G06F 17/30442 707/764 |
| 2016/0124899 A1* | 5/2016 | Vasishta | G06F 15/7807 712/35 |
| 2016/0147679 A1* | 5/2016 | Guddeti | G06F 13/24 710/269 |
| 2016/0302255 A1* | 10/2016 | Takeda | H04W 4/005 |
| 2016/0364349 A1* | 12/2016 | Okada | G06F 9/45545 |
| 2016/0378533 A1* | 12/2016 | Takeuchi | G06F 9/5077 718/1 |

FOREIGN PATENT DOCUMENTS

| | | |
|---|---|---|
| JP | 2007-148746 | 6/2007 |
| JP | 2014-165803 | 9/2014 |

* cited by examiner

PARALLEL PROCESSING DEVICE AND PARALLEL PROCESSING METHOD

CROSS-REFERENCE TO RELATED APPLICATION

This application is based upon and claims the benefit of priority of the prior Japanese Patent Application No. 2015-199148, filed on Oct. 7, 2015, the entire contents of which are incorporated herein by reference.

FIELD

The present invention relates to a parallel processing device and a parallel processing method.

BACKGROUND

With recent central processing units (CPUs), a plurality of CPUs (or CPU cores or processors) are used to perform parallel processing on large-scale data such as multimedia data in order to improve processing performance. It is not preferable to increase the operating frequency of a conventional CPU or memory because the increase in the operating frequency thereof leads to an increase in power consumption and, by extension, an increase in the heat generation amount of a chip.

As a method for further improving performance, it is proposed to cause a field programmable gate array (FPGA) circuit or a programmable logic device (PLD), which is a type of reconfigurable circuits capable of reconfiguring a hardware circuit, to execute processing of part of a process currently being executed. The FPGA circuit configures an operation circuit suitable for processing in question, based on circuit definition data (or configuration data). In addition, since the FPGA circuit has a plurality of operation circuits, it is also possible to configure a plurality of the operation circuits using the configuration data and perform parallel operation processing. Further, it is predicted that, in the future, the central processing unit will include the FPGA circuit in addition to a plurality of processors (or CPUs or CPU cores), and the processors will cause the FPGA circuit to execute processing of part of the process currently being executed by CPU core.

Japanese Laid-open Patent Publication No. 2006-260377 indicates that, although the reconfigurable circuit is not used here, a plurality of processors request peripheral hardware to execute a task. And, Japanese Laid-open Patent Publication No. 2006-119802 and Japanese Laid-open Patent Publication No. 2007-148746 disclose a related art.

SUMMARY

However, in a multiprocessor, a plurality of processors process a plurality of processes alternately in parallel based on a round-robin system, stop execution of the process currently being executed when an interrupt occurs, and execute an interrupt process having a higher priority. Accordingly, a case is assumed in which, after the processor requests the FPGA circuit to execute processing of part of the process currently being executed and before the processing of the FPGA circuit is completed, the execution of this process is moved to another processor.

In this case, when the processing of the FPGA circuit is completed, the other processor activates the original process and reconfigures its operating environment, and resumes the execution of the original process. An example of the reconfiguration of the operating environment includes resetting of context data of internal registers of the processor. Accordingly, there are cases where overhead time for activating the original process exceeds processing time in the FPGA circuit, and throughput of an operation processing circuit is thereby reduced. When the number of times of the processing by the FPGA circuit is increased in addition to short processing time in the FPGA circuit, a greater reduction in throughput is caused.

According to an aspect of the first embodiments, a parallel processing device includes a plurality of processors that execute respective processes and cause an FPGA circuit to process part of the processes, wherein a first processor of the plurality of the processors requests the FPGA circuit to execute processing of part of a first process currently being executed, and transitions to a wait state of processing completion of the FPGA circuit and, in a case where the first processor transitions to an execution of a second process, the first processor sends movement-destination processor information to the FPGA circuit, and also sends, to a movement-destination processor, environment setting information for continuous processing of the first process after completion of the processing of the part of the first process in the FPGA circuit, and the movement-destination processor performs setting of the environment setting information during the execution of the processing of the part of the first process by the FPGA circuit, and continues the processing of the first process in response to a processing completion notification from the FPGA circuit.

According to the first aspect, it is possible to prevent a reduction in throughput.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
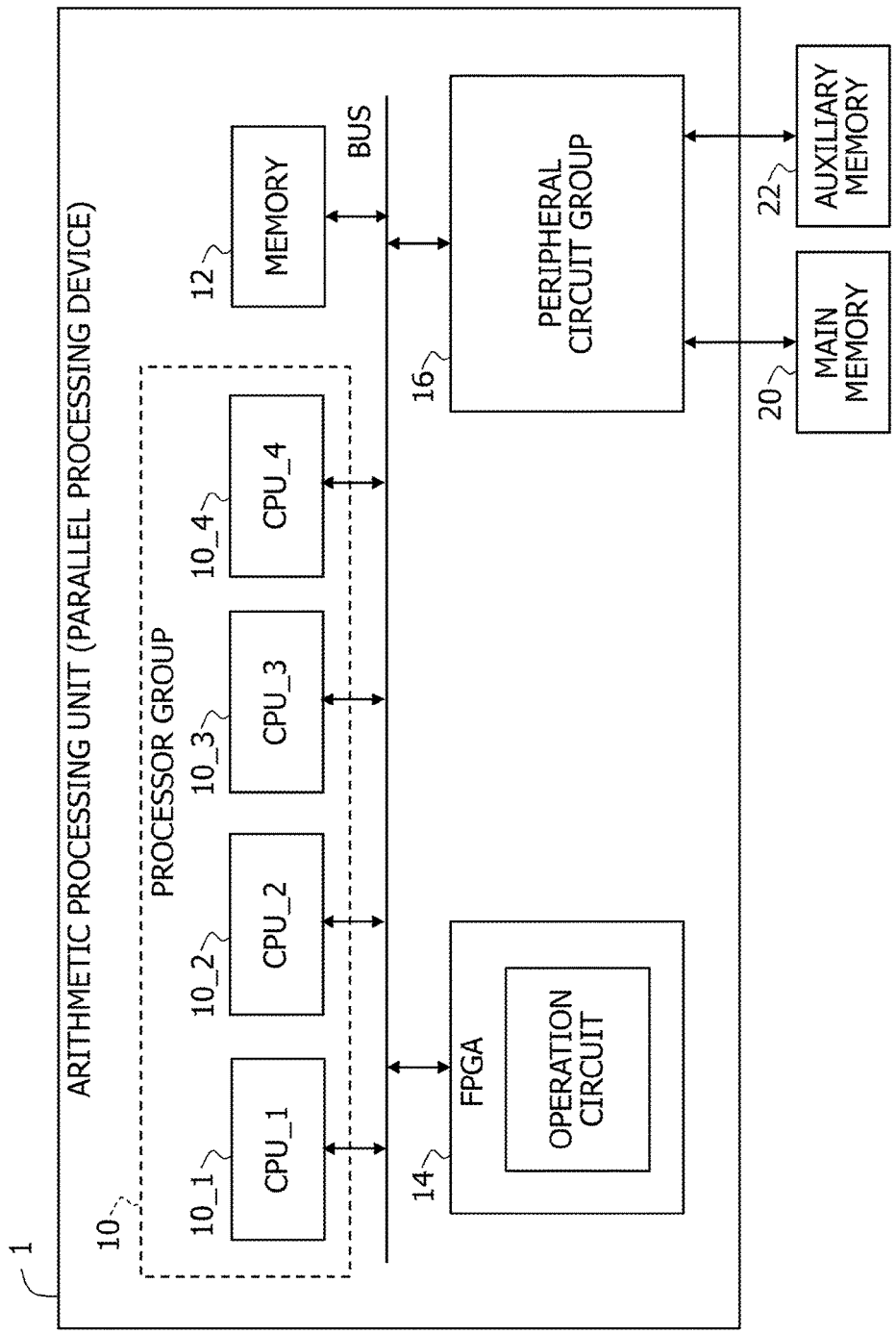
FIG. 1 is a view illustrating an example of a parallel processing device.

FIG. 1 is a view illustrating an example of a parallel processing device. A parallel processing device 1 is an arithmetic processing unit that has a plurality of CPUs (or CPU cores or processors, hereinbelow collectively referred to as processors), and is a system LSI chip. Hereinbelow, the parallel processing device is referred to as the arithmetic processing unit.

The arithmetic processing unit 1 has a processor group 10 having four processors 10_1 to 10_4, an internal memory 12, a bus BUS, and a peripheral circuit group 16. To the peripheral circuit group 16, for example, a main memory 20 constituted by a DRAM capable of high-speed access and a large-capacity non-volatile auxiliary memory 22 such as a flash memory or a hard disk are connected. The arithmetic processing unit 1 has an FPGA circuit 14 as one of reconfigurable circuits inside the arithmetic processing unit 1. The FPGA circuit 14 may be provided outside the chip (the arithmetic processing unit) and, in this case as well, the FPGA circuit 14 is connected to the processor via the peripheral circuit group 16.

In the auxiliary memory 22, an operating system (OS), a plurality of application programs, and other data that are not illustrated are stored. The OS and the application programs are loaded into the main memory and executed by each processor.

A plurality of the processors 10_1 to 10_4 in the arithmetic processing unit 1 executes processes of a plurality of the application programs sequentially in parallel. Each of the processors executes any process of the processes only for a predetermined time period, and executes a different process after the lapse of the predetermined time period. With this, the processors sequentially execute the processes based on a round-robin system. The processing of the processes by the processors based on the round-robin system is controlled by the OS that is executed together with the process by each processor.

Further, when an interrupt occurs during execution of a given process, each of the processors temporarily stops the process currently being executed with control of an interrupt handler of the OS, and starts execution of an interrupt process having a high priority. Subsequently, the interrupt handler searches for another processor in an idle state (or an available state), and causes the detected processor to execute the original process.

Each of the processors requests the FPGA circuit to execute processing of part of the process currently being executed. Accordingly, the processor sets configuration data in the FPGA circuit to configure an operation circuit capable of executing the processing of part of the process in the FPGA circuit. Subsequently, the processor outputs input data of a processing target to the FPGA circuit, and the operation circuit configured in the FPGA circuit executes the operation of the input data, and returns the operation result to the processor as the request source.

Figure 2:
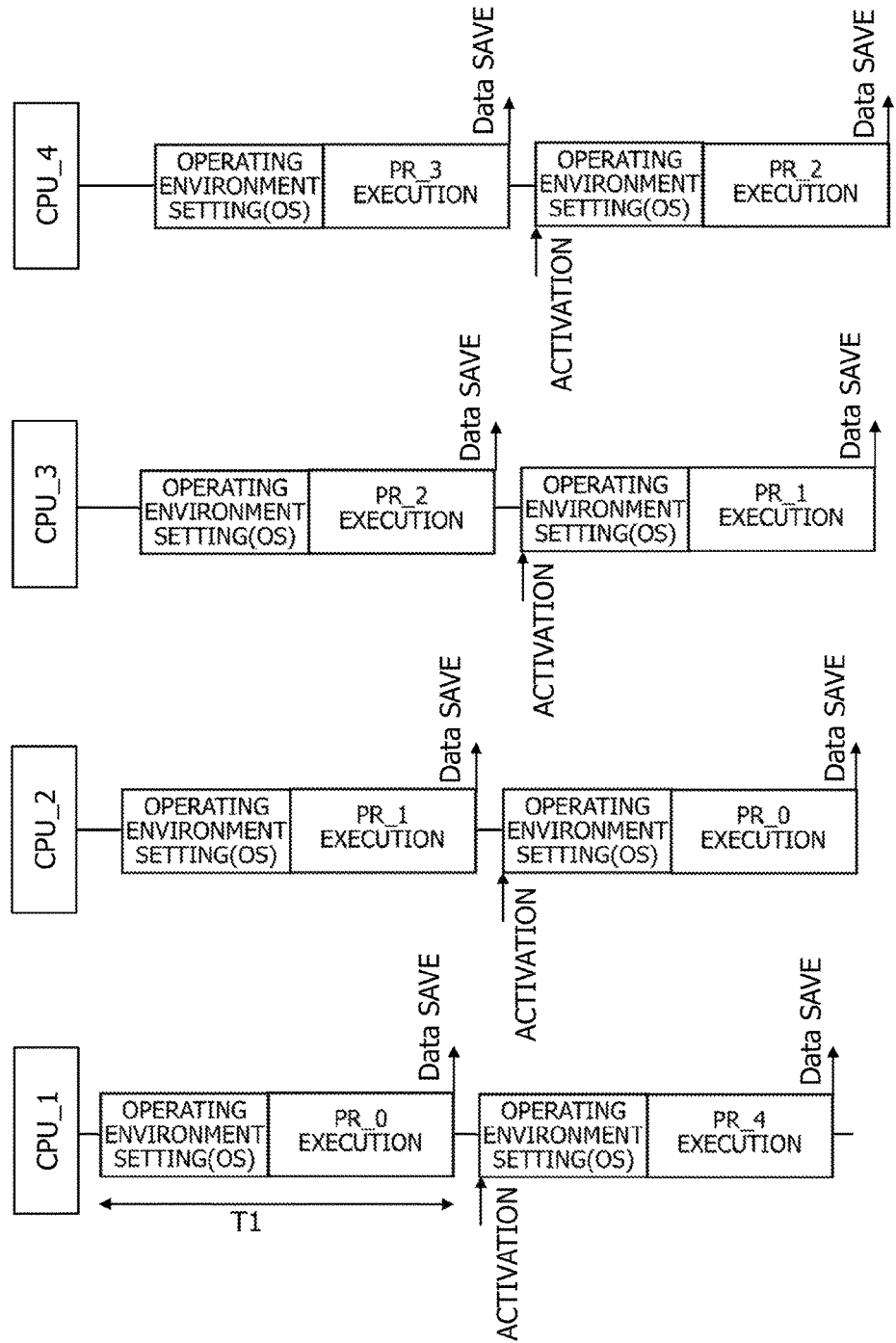
FIG. 2 is a view illustrating parallel processing of a plurality of processes based on the round-robin system by the multiprocessor.

FIG. 2 is a view illustrating parallel processing of a plurality of processes based on the round-robin system by the multiprocessor. Herein, five processes PR_0 to PR_4 are processing targets, and four processors CPU_1 to CPU_4 performs parallel processing of the five processes PR_0 to PR_4 sequentially in rotation.

First, the processor CPU_1 executes the process PR_0. The CPU_1 executes the OS to activate the process PR_0, and performs operating environment setting in which initial value data sets are set in various registers and registers for memory control in the processor. Thereafter, the CPU_1 starts the execution of the process PR_0. Similarly, the processors CPU_2 to CPU_4 activate the processes PR_1, PR_2, and PR_3 and set the operating environments thereof, and execute the individual processes.

The individual processors CPU_1 to CPU_4 execute the individual processes for a predetermined time period T1, then suspend the execution of the processes, save environment setting information such as the context data of the registers in the processors into the internal memories, the main memories, or the auxiliary memories, and initiate the activation and execution of other processes waiting for execution. In an example in FIG. 2, the processor CPU_1 suspends the execution of the process PR_0, activates another process PR_4 and performs the operating environment setting, and starts the execution of the process PR_4. Similarly, the processor CPU_2 suspends the execution of the process PR_1, saves the context data in the memory, and activates and executes another process PR_0. The processor CPU_3 suspends the execution of the process PR_2 and activates and executes another process PR_1, and the processor CPU_4 suspends the execution of the process PR_3 and activates and executes another process PR_2.

Thus, since a plurality of the processes are subjected to the parallel processing based on the round-robin system, the process as the execution target is changed every predetermined time period T1 in each processor. Accordingly, the OS of each processor monitors the execution time of each process, suspends the execution of the process and saves the environment setting information every predetermined time period, and activates and executes another process selected from the processes waiting for the execution. In addition, for example, in the case where the processor in the idle state is present, the process of which the execution is suspended is activated and executed in the processor. However, in the case where the processor in the idle state is not present, the process is added to the group of the processes waiting for the execution.

Figure 3:
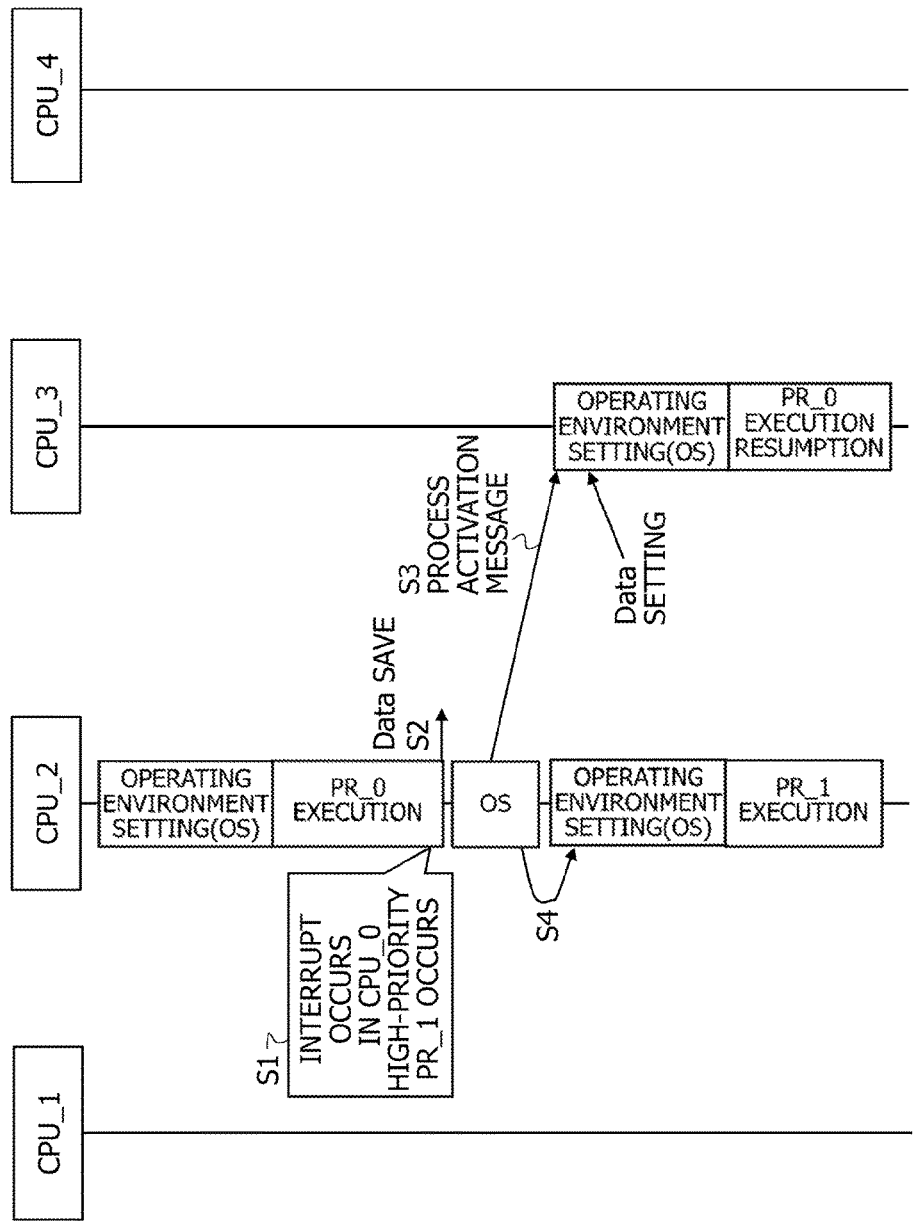
FIG. 3 is a view illustrating interrupt processing by the multiprocessor.

FIG. 3 is a view illustrating interrupt processing by the multiprocessor. Herein, FIG. 3 illustrates an example in which the interrupt occurs during the execution of the process PR_0 by the processor CPU_2, and the process PR_1 having a priority higher than that of the process PR_0 is activated and executed. In FIG. 3, the interrupt occurs in the processor CPU_2 during the execution of the process PR_0 after the processor CPU_2 performs the operating environment setting of the process PR_0 (S1). In response to this, the OS of the processor CPU_2 suspends the execution of the process PR_0 and saves the context data thereof in the memory or the like (S2).

Subsequently, the OS of the processor CPU_2 searches for another processor in the idle state, detects that the processor CPU_3 is in the idle state, and transmits a process activation message as one of inter-processor messages to the processor CPU_3 (S3). The process activation message includes identification information of the process PR_0 as the activation target and a storage destination address of the data saved during the suspension of the execution of the process PR_0 in addition to message type information. In response to this, the processor CPU_3 sets saved data in activation processing of the process PR_0 to configure the operating environment, and resumes the execution of the process PR_0.

In the case where it is not possible to detect another processor in the idle state, the suspended process PR_0 is added to the queue of the group of the processes waiting for the execution, and will be activated and executed by any processor later.

On the other hand, the OS of the processor CPU_2 activates the process PR_1 as the interrupt process (S4). With the activation processing, the OS of the processor CPU_2 sets the context data of the process PR_1 in the registers to set the operating environment, and starts the execution of the process PR_1.

Figure 4:
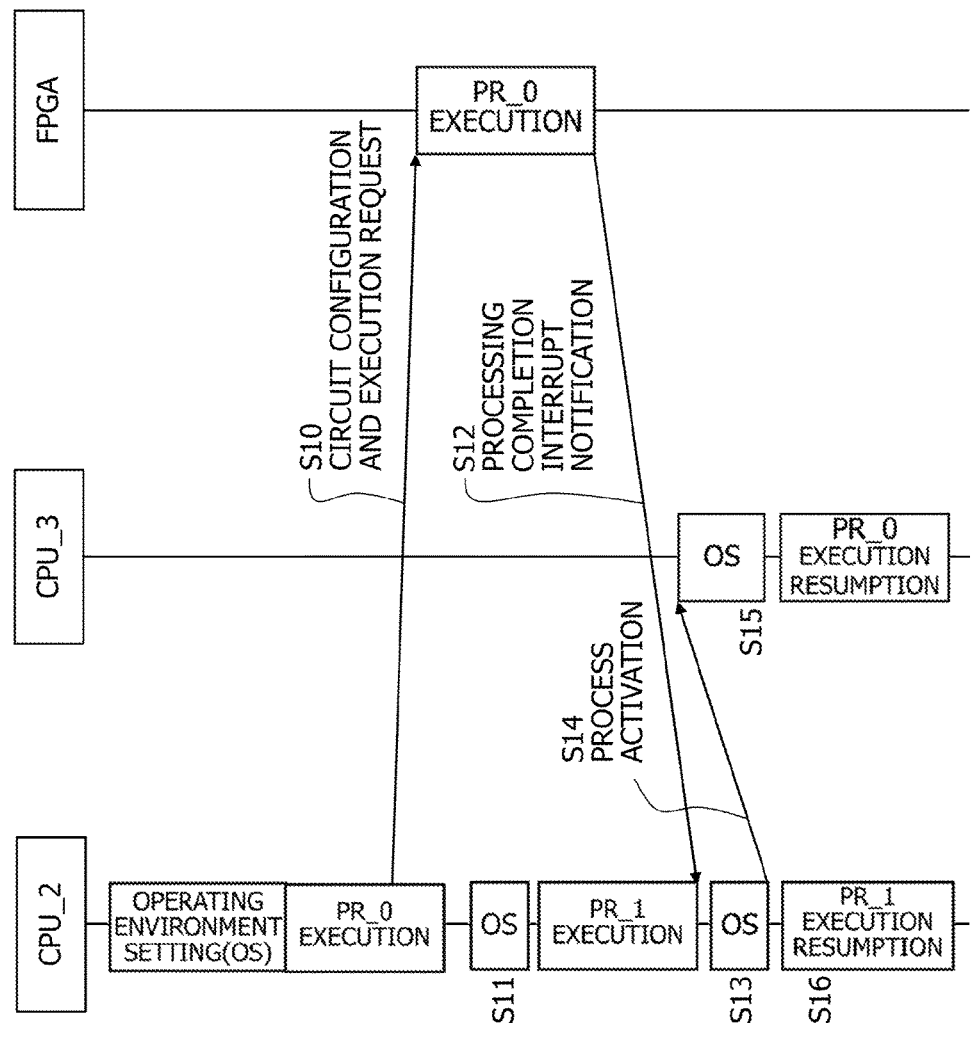
FIG. 4 is a view illustrating an operation example in the case where a given processor of the multiprocessor requests the FPGA circuit to execute processing of part of the process currently being executed.

FIG. 4 is a view illustrating an operation example in the case where a certain processor of the multiprocessor requests the FPGA circuit to execute processing of part of the process currently being executed. In the example in FIG. 4, during the execution of the process PR_0 by the processor CPU_2, the processor CPU_2 requests the FPGA circuit to execute the processing of part of the process PR_0 (S10). The configuration data for configuring the operation circuit is attached to the request for execution of processing of part thereof. As a result, the FPGA circuit configures the operation circuit corresponding to the requested processing, and the operation circuit executes the processing of part of the process PR_0. On the other hand, the processor CPU_2 transitions to a wait state of processing completion of the FPGA circuit of the process PR_0.

However, thereafter, the interrupt occurs in the processor CPU_2, the process PR_0 is suspended, and another process PR_1 having a high priority is activated and executed (S11). In a short time, the FPGA circuit completes the processing requested by the processor CPU_2, and transmits a processing completion notification to the processor CPU_2 as the request source as an interrupt signal (S12).

At this point of time, the OS of the processor CPU_2 detects the processor CPU_3 in the idle state (S13), and transmits a massage for activating the process PR_0 to the processor CPU_3 (S14). In response to this, the processor CPU_3 activates the process PR_0 to set the operating environment, executes the process PR_0, and resumes the execution of the processing of the process PR_0 subsequent to the processing by the FPGA circuit (S15). In addition, for example, the processor CPU_2 resumes the execution of the process PR_1 (S16).

In the operation example described above, when the processing in the FPGA circuit is completed, the original process PR_0 having invoked the processing in the FPGA circuit is activated not in the original processor CPU_2 but in another processor CPU_3 in the idle state at this point of time. In this case, the processor CPU_3 activates the process PR_0 to perform processing for setting the operating environment and resumes the execution of the process PR_0. Overhead time for performing the operating environment setting processing becomes longer than the processing time in the FPGA circuit, a reduction in the throughput of the arithmetic processing unit is caused. In particular, when the activation of the FPGA circuit frequently occurs, the reduction in throughput caused by the overhead time becomes greater. In addition, in the case where a mobile terminal has the arithmetic processing unit, the operating frequency is low, and hence the overhead time becomes longer.

Further, in the case where the processor in the idle state is not present after the completion of the processing of the FPGA circuit, the original process PR_0 having invoked the FPGA circuit is brought into an execution wait state, and is caused to wait for a specific time period before the execution is resumed, and hence the overhead time further becomes longer, and the reduction in throughput further becomes greater. In general, in order to increase versatility, the FPGA circuit includes circuits for performing simple and highly versatile operation processing. Consequently, the processing time of the FPGA circuit tends to be shorter comparing to the overhead time described above, and the reduction in throughput is inevitable.

First Embodiment

Figure 5:
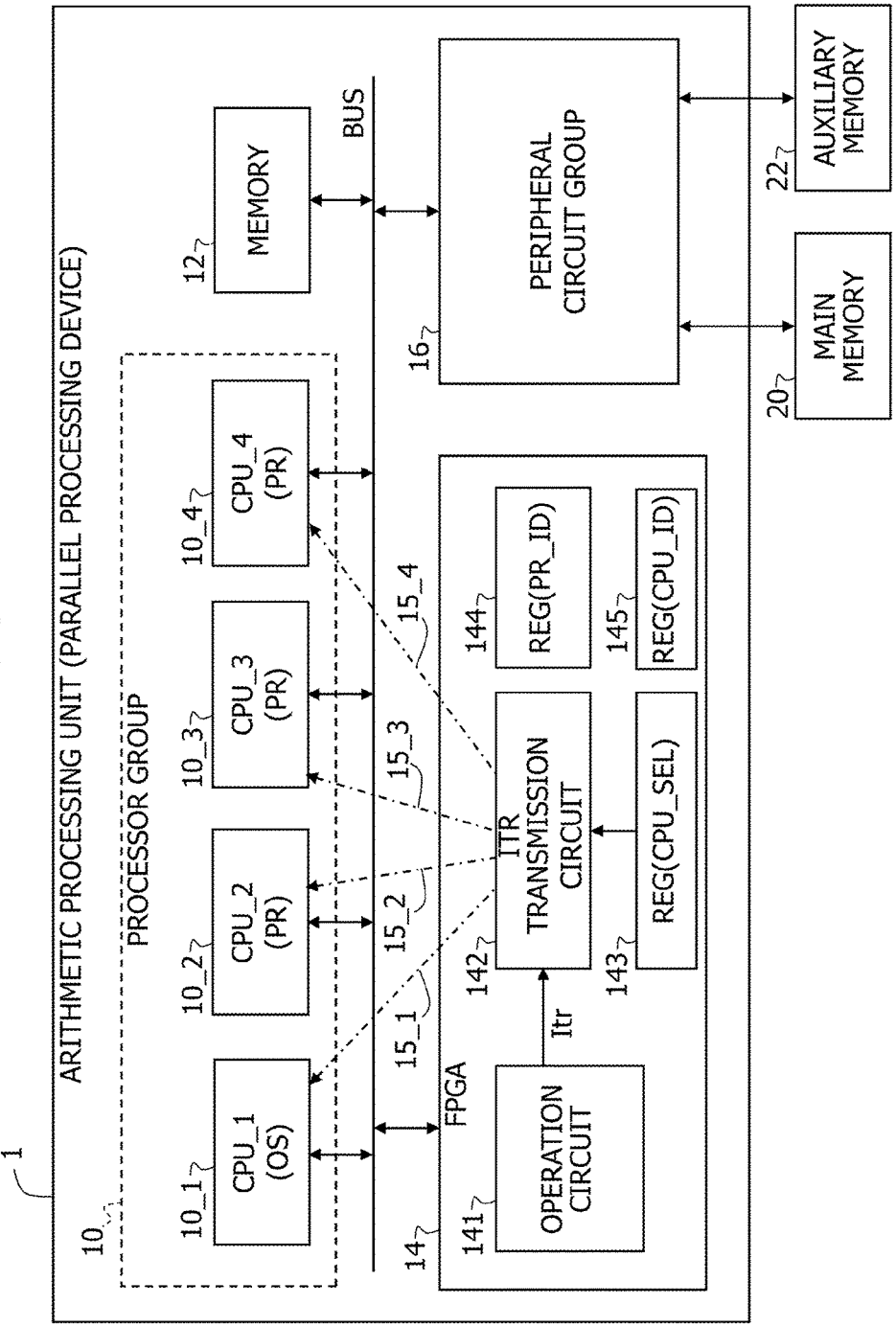
FIG. 5 is a view illustrating a configuration example of the parallel processing device (or the arithmetic processing unit) in a first embodiment.

FIG. 5 is a view illustrating a configuration example of the parallel processing device (or the arithmetic processing unit) in a first embodiment. Similarly to FIG. 1, the arithmetic processing unit 1 in FIG. 5 is the system LSI chip having a plurality of the processors 10_1 to 10_4.

The arithmetic processing unit 1 has the processor group 10 having the four processors 10_1 to 10_4, the internal memory 12, the bus BUS, and the peripheral circuit group 16. To the peripheral circuit group 16, the main memory 20 capable of high-speed access and the large-capacity non-volatile auxiliary memory 22 are connected. The arithmetic processing unit 1 has the FPGA circuit 14 as one of reconfigurable circuits inside the arithmetic processing unit 1. However, the FPGA circuit 14 may also be provided outside the chip and, in this case, the FPGA circuit 14 is connected to the processors via the peripheral circuit group 16.

In the auxiliary memory 22, the operating system (OS), a plurality of the application programs, and other data that are not illustrated are stored. The OS and the application programs are loaded into the main memory and executed by each processor.

The method for controlling the process assignment to the multiprocessor by the OS is similar to that of the example in FIG. 1, and a plurality of the processors are caused to execute a plurality of the processes sequentially in parallel based on the round-robin system. In addition, when the interrupt occurs in the processor, the OS suspends the process currently being executed, lowers the priority of the process currently being executed, and activates and executes the interrupt process. Subsequently, when the processor in the idle state is present, the OS causes the processor to activate and execute the suspended process and, when the processor in the idle state is not present, the OS adds the process to the group of the waiting processes and causes the process to wait for the next execution.

In addition, when the processor requests the FPGA circuit to execute the processing of part of the process currently being executed, the OS of the present embodiment controls the process to be in the wait state of the processing completion of the FPGA circuit for a specific time period. When the processing of the FPGA circuit is completed during the wait state of the processing completion as a short time period, the OS resumes the execution of the process in the processor. In this case, the activation processing of the process (environment setting processing) is not necessary, and hence the processor resumes the execution of the process immediately.

However, when the specific time period of the wait state of the processing completion has elapsed before the processing of the FPGA circuit is completed, the OS searches for another processor in the idle state, and requests the detected processor to activate the process in the wait state. In response to this, the detected processor activates the process during execution of the processing by the FPGA circuit, to perform the setting processing of the operating environment for the execution of the process. Consequently, when the FPGA circuit has completed the processing thereafter, since the activation processing of the process is already completed, the detected processor resumes the execution of the process immediately in response to the processing completion notification. As a result, the overhead time explained in FIG. 4 is eliminated or shortened.

The FPGA circuit 14 illustrated in FIG. 5 has an operation circuit 141 that configures the operation circuit based on the configuration data, four processing completion notification signal lines 15_1 to 15_4 provided between the FPGA circuit 14 and the individual processors 10_1 to 10_4, and a processing completion notification signal transmission circuit 142 that outputs processing completion notification signals as an interrupt signal. The transmission circuit 142 transmits a processing completion notification signal Itr outputted by the operation circuit 141 to the processor via any of the processing completion notification signal lines 15_1 to 15_4.

Further, the FPGA circuit 14 has a selection register 143, a processor ID register 145 in which an ID of the processor as the request source that has requested the FPGA circuit to execute the processing is stored, and a process ID register 144 in which an ID of the process that has invoked the FPGA circuit is stored. The selection register 143 stores a selection bit corresponding to the request-source processor, and the processing completion notification signal transmission circuit 142 selects the processing completion notification signal line 15 corresponding to the request-source processor based on the selection bit in the selection register 143 and outputs the processing completion notification signal Itr.

Figure 6:
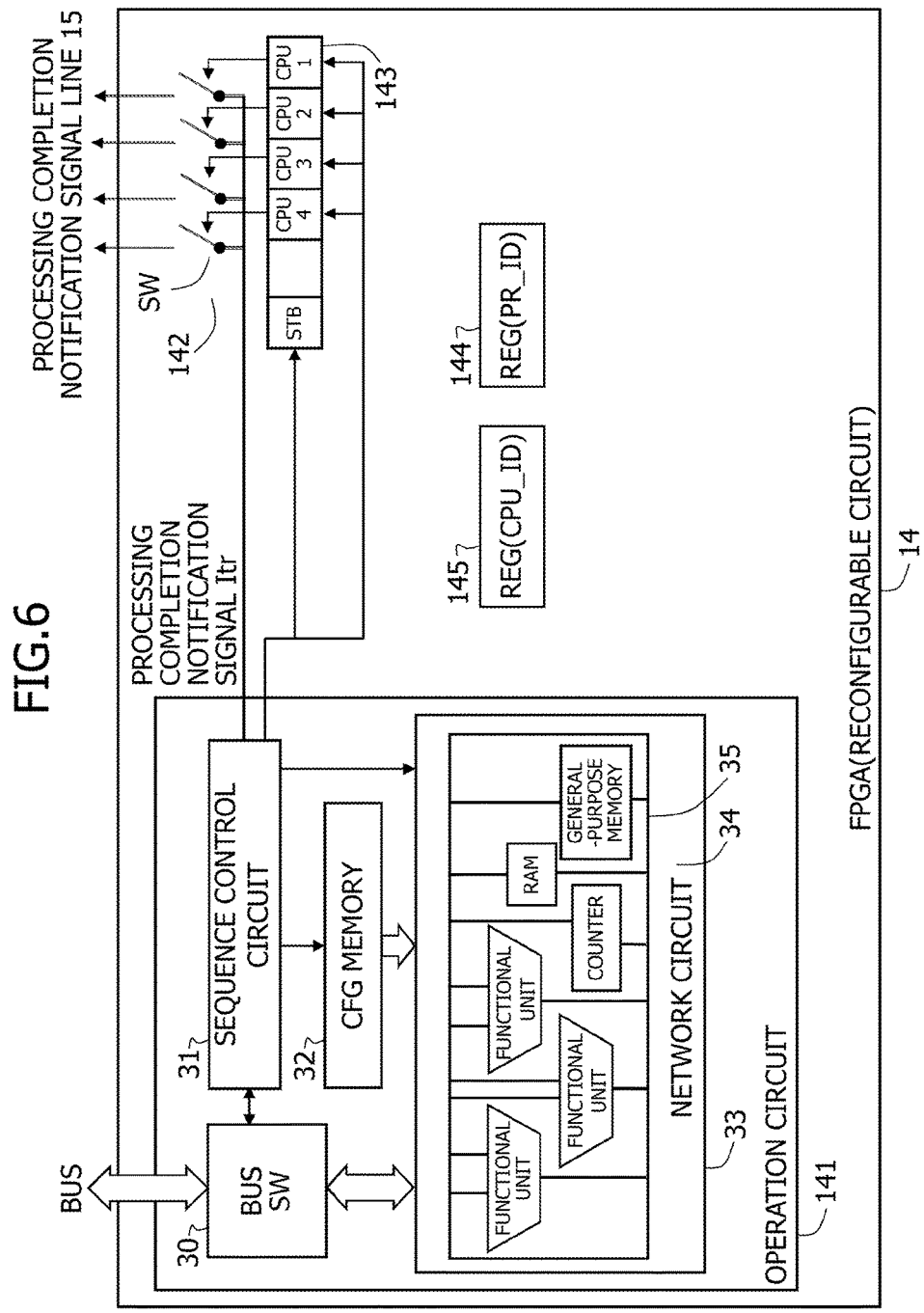
FIG. 6 is a view illustrating the detailed configuration of the FPGA circuit.

FIG. 6 is a view illustrating the detailed configuration of the FPGA circuit. The FPGA circuit 14 as one of the reconfigurable circuits has the operation circuit 141, the processor ID register 145, the process ID register 144, and the processing completion notification signal transmission circuit 142.

As illustrated in the drawing, the processing completion notification signal transmission circuit 142 has a switch group SW that connects the signal line to which the processing completion notification signal Itr is outputted to any of the processing completion notification signal lines 15, and each switch of the switch group SW is controlled with the selection bit in the selection register 143.

The operation circuit 141 has a bus switch 30 that is connected to the bus BUS and a sequence control circuit 31 that controls the reconfiguration, processing execution, and processing completion of the operation circuit. Further, the operation circuit 141 has a configuration memory 32 that stores the configuration data supplied from the CPU via the bus BUS. In addition, the operation circuit 141 has a reconfigurable operation unit 33 having an operation unit 35 that has a plurality of functional units, counters, RAMs, and general-purpose memories, and a network circuit 34 that mutually connects the functional units and the counters in the operation unit 35.

The processor that is executing the process executes an instruction code that requests the processing of the FPGA circuit in the process, and transmits a processing execution request signal having the configuration data and processing data to the FPGA circuit via the bus BUS. As illustrated in FIG. 6, the FPGA circuit inputs the configuration data to the sequence control circuit 31 via a bus switch 30, and the sequence control circuit 31 stores the configuration data in the configuration memory 32. In addition, the FPGA circuit supplies processing input data to the reconfigurable operation unit 33 via the bus switch 30.

With sequence control of the sequence control circuit 31, the reconfigurable operation unit 33 configures the operation circuit that executes the requested processing based on the configuration data, and the processing data is inputted to the operation circuit and is processed.

In addition, the sequence control circuit 31 stores the ID of the request-source processor and the ID of the invocation-source process that has invoked the FPGA circuit, included in the processing execution request signal, in the processor ID register 145 and the process ID register 144. In addition, the sequence control circuit 31 sets the selection bit in the selection register 143 based on interrupt notification destination CPU information included in the processing execution request signal. Subsequently, the sequence control circuit generates the processing completion notification signal Itr when the processing by the reconfigurable operation unit 33 is completed, and the processing completion notification signal transmission circuit 142 outputs the processing completion notification signal Itr to the selected processing completion notification signal line 15 via one switch SW that is controlled to be conductive in correspondence to the selection bit in the selection register 143.

Figure 7:
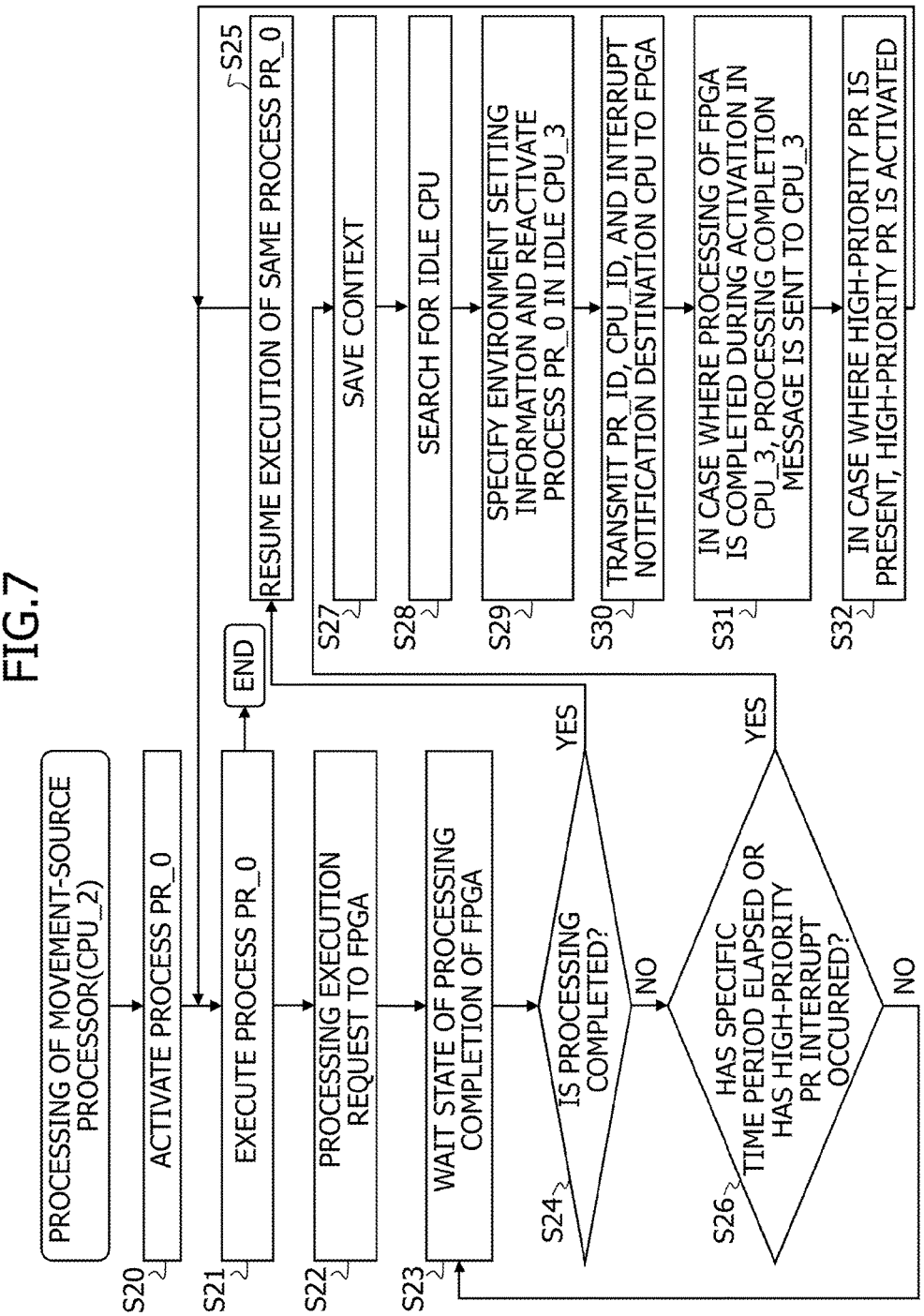
FIG. 7 is a flowchart illustrating the operation of the processor as the movement source of the process.

FIG. 7 is a flowchart illustrating the operation of the processor as the movement source of the process. In FIG. 7, the operation of the processor CPU_2 as the movement source is illustrated as an example. In the processor CPU_2, the OS activates the process PR_0 (S20). The activation processing of the process by the OS includes processing for setting the environment setting information for executing the process. The setting of the environment setting information includes setting of the context data such as the initial value of the register and other set values in the processor, and prefetching of the instruction code of the process and storing of the instruction code in an instruction cache memory in the processor CPU_2.

Next, after the activation processing of the process PR_0, the processor CPU_2 executes the process PR_0 (S21). When the processing of the process PR_0 is completed, the processing by the processor is ended. On the other hand, when the instruction code for requesting the FPGA circuit to execute the processing is issued during the execution of the process, the processor CPU_2 transmits the processing execution request signal to the FPGA circuit together with the configuration data (S22). The processing execution request signal includes the configuration data as definition data of the operation circuit corresponding to the requested processing, the processing data that is inputted to the reconfigured arithmetic unit in the FPGA circuit, the request-source processor ID, and the invocation-source process ID. The processing execution request signal may further include the interrupt notification destination CPU information for setting the selection bit in the selection register 143 described above. As will be described later, the FPGA circuit configures the operation circuit that executes the processing based on the configuration data.

Subsequently, the process PR_0 of the processor CPU_2 is brought into the wait state of the processing completion of the FPGA circuit (S23). However, the process PR_0 continues to occupy the processor CPU_2. The wait state of the processing completion continues for a predetermined specific time period.

When the processing by the FPGA circuit is completed during the wait state of the processing completion (YES in S24), the processor CPU_2 receives the processing completion notification signal from the FPGA circuit, and resumes the execution of the process PR_0 that has been in the wait state of the process completion (S25). In this case, since the environment of the process PR_0 is already set, the processor CPU_2 resumes the execution of the process PR_0 immediately. In addition, the processor CPU_2 having received the processing completion notification signal may acquire the processor ID and the process ID in the registers in the FPGA circuit, determine that the processor CPU_2 matches the processor indicated by the processor ID, and determine that the process indicated by the process ID matches the process PR_0 in the wait state of the processing completion.

On the other hand, when the process by the FPGA circuit is not completed during the wait state of the processing completion (NO in S24), the specific time period has elapsed (YES in S26) or the interrupt of the process having the high priority has occurred with the interrupt signal (YES in S26), the OS of the processor CPU_2 executes an interrupt handler. The interrupt handler of the OS saves the context data of the process PR_0 in the memory (S27), and searches for another processor in the idle state (S28). When another processor in the idle state (e.g., CPU_3) is found, the processor CPU_2 transmits the process activation message for requesting the activation of the process PR_0 to another processor CPU_3 (S29). The process activation message includes the address of the environment setting information such as the saved context data and the processing result. In response to the process activation message, another processor CPU_3 executes the activation processing of the process PR_0. In the case where another processor in the idle state is not found, the processor CPU_2 adds the suspended process PR_0 to the group of the processes waiting for the activation, and causes the process to wait until another processor in the idle state is found.

Further, the OS of the processor CPU_2 transmits the ID of the processor as the movement destination of the process PR_0 (CPU_ID), the ID of the process as the invocation source (PR_ID), and the interrupt notification destination CPU information to the FPGA circuit that has been requested to execute the processing (S30). In response to this, the FPGA circuit sets these information sets in the registers.

In the case where the processing of the FPGA circuit is completed during the activation in another processor CPU_3, the processor CPU_2 receives the processing completion notification signal from the FPGA circuit. That is, in the case where the notification of the movement-destination processor ID and the interrupt notification destination CPU information to the FPGA circuit by the processor CPU_2 and the transmission of the processing completion notification signal by the FPGA circuit occur almost at the same time and, the FPGA circuit transmits the processing completion notification signal prior to setting the movement-destination processor ID and the interrupt notification destination CPU information by the FPGA circuit, the processing completion notification signal from the FPGA circuit is sent to the processor CPU_2 as the movement source. To cope with this, when the processor CPU_2 as the movement source receives the processing completion notification signal, the processor CPU_2 transmits a processing completion message to the processor CPU_3 as the movement destination (S31). That is, the processor CPU_2 transfers the processing completion notification to the movement-destination processor CPU_3.

In the case where the interrupt process having the high priority is present, the processor CPU_2 activates the process (S32).

Figure 8:
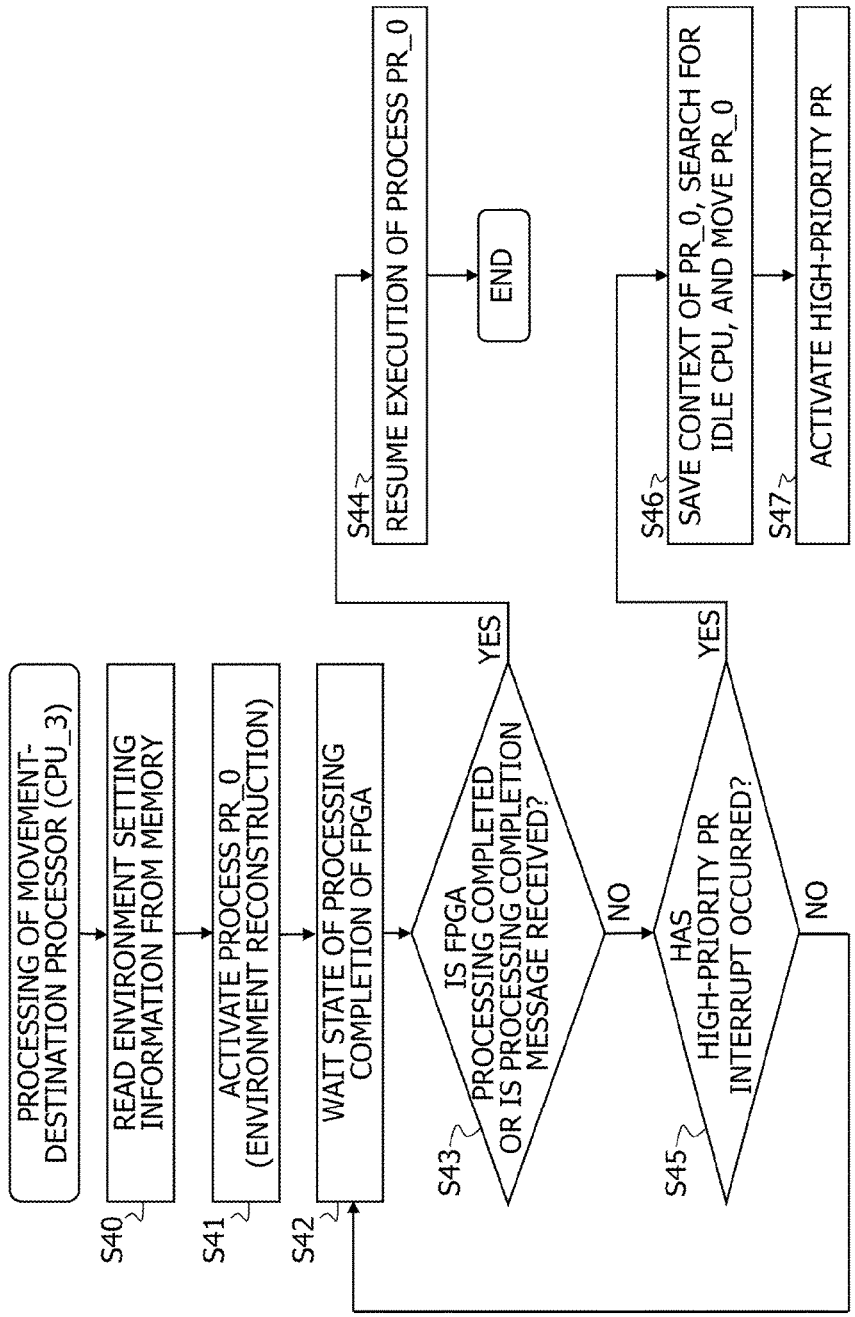
FIG. 8 is a flowchart illustrating the operation of the processor as the movement destination of the process.

FIG. 8 is a flowchart illustrating the operation of the processor as the movement destination of the process. FIG. 8 illustrates the operation when the process PR_0 explained in FIG. 7 has moved from the processor CPU_2 to the processor CPU_3. When the processor CPU_3 as the movement destination receives the activation message of the process PR_0 from the processor CPU_2, the processor CPU_3 reads the environment setting information from the memory in accordance with the address of the save destination of the environment setting information included in the activation message (S40), and activates the process PR_0 to set the operating environment in the processor (S41). With this, the operating environment of the process PR_0 is reconstructed in the processor CPU_3 (S44).

However, since the process PR_0 has been in the wait state of the processing completion of the FPGA circuit, the processor CPU_3 transitions to the wait state of the processing completion of the FPGA circuit (S42). Subsequently, when the processor CPU_3 receives the processing completion notification from the FPGA circuit or receives the processing completion message from the processor CPU_2 as the movement source (S43), the processor CPU_3 resumes the execution of the process PR_0.

When the interrupt of the process having the high priority occurs before the reception of the processing completion notification of the FPGA circuit (YES in S45), similarly to the processor CPU_2 in FIG. 7, the processor CPU_3 saves the context (the environment setting information) of the process PR_0 in the memory, searches for the idle processor, moves the process to the movement-destination processor when the idle processor is found, and notifies the FPGA circuit of movement-destination processor information (S46). Subsequently, the processor CPU_3 activates the interrupt process having the high priority (S47).

Figure 9:
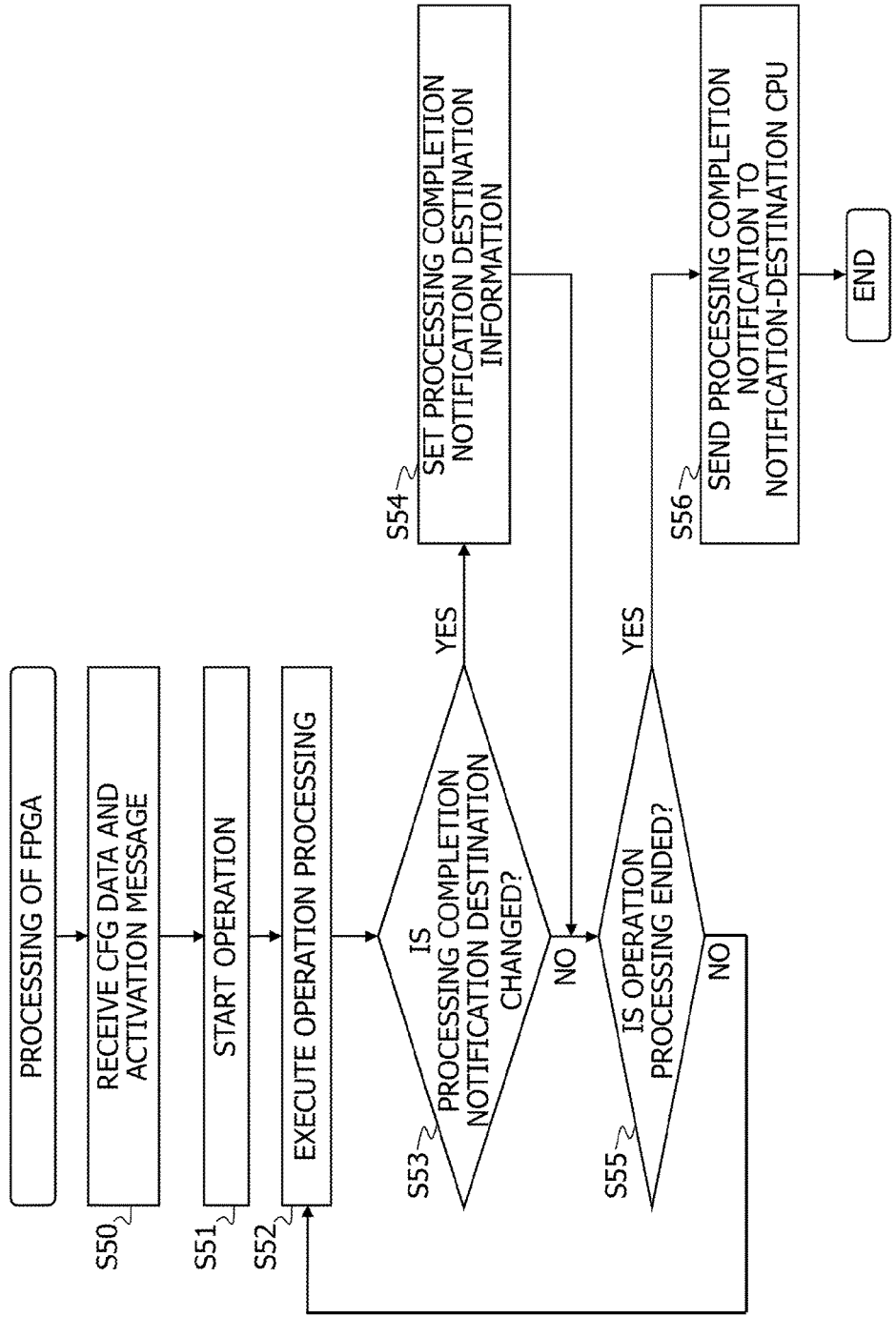
FIG. 9 is a flowchart illustrating the operation of the FPGA circuit.

FIG. 9 is a flowchart illustrating the operation of the FPGA circuit. When the FPGA circuit receives the configuration data and the processing execution request from the processor (S50), the FPGA circuit starts the execution of the operation processing (S51). The processing data is attached to the processing execution request, the FPGA circuit configures the operation circuit corresponding to the processing with the configuration data, and the operation circuit receives the processing data and executes the operation processing.

Subsequently, when the change of the processing completion notification destination occurs (S53) during the execution of the operation processing (S52), the FPGA circuit sets the interrupt notification destination CPU information after the change in the register (S54). As illustrated in FIG. 6, when the processing completion notification destination CPU is changed, the sequence control circuit 31 outputs the selection bit set in the selection register 143 in accordance with the interrupt notification destination CPU information, and sets "1" as a strobe bit STB. The selection register 143 latches the selection bit at a predetermined clock timing with STB=1, and changes the strobe bit to STB=0. Further, when the operation processing is completed (S55), the sequence control circuit of the FPGA circuit generates the processing completion notification signal Itr, and the transmission circuit 142 transmits the processing completion notification signal to the notification-destination processor as the interrupt signal (S56).

Next, based on the flowcharts in FIGS. 7, 8, and 9, three kinds of operations of the arithmetic processing unit will be described.

Figure 10:
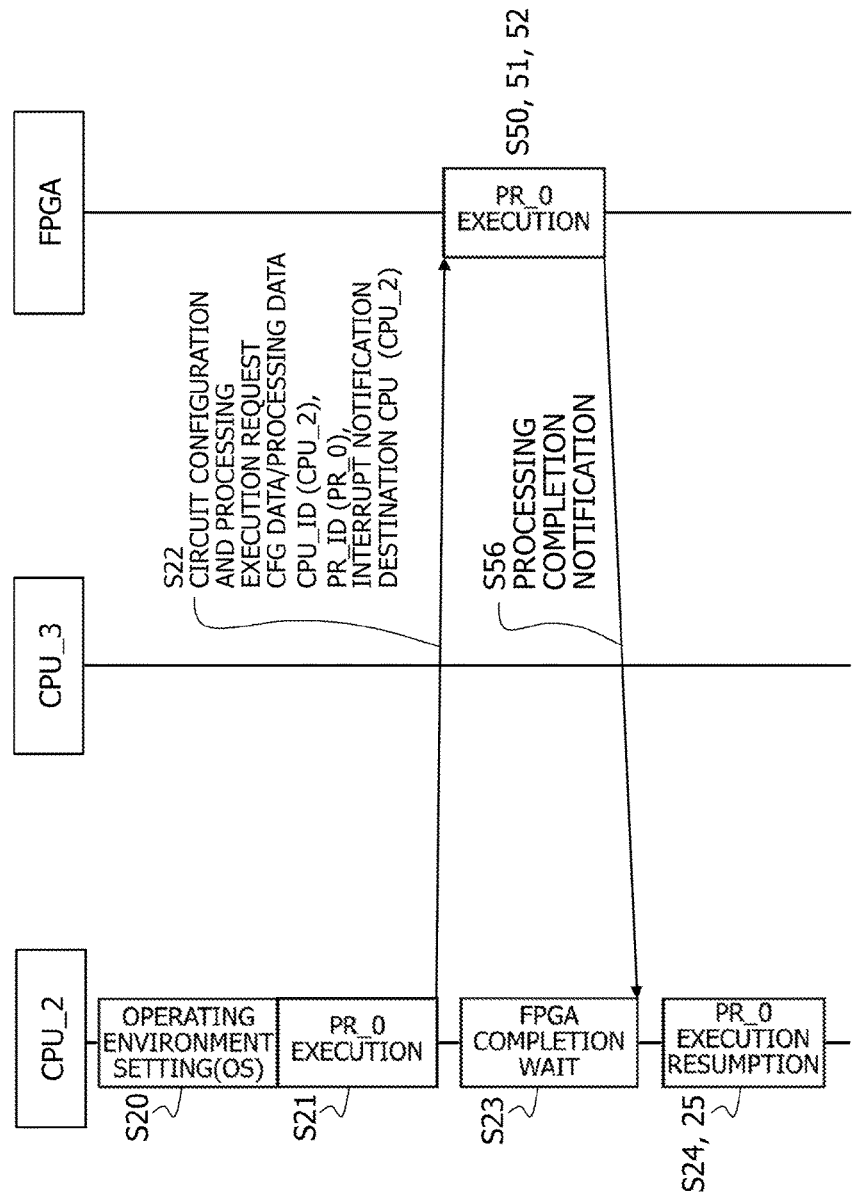
FIG. 10 is a sequence diagram illustrating a first operation of the arithmetic processing unit.

FIG. 10 is a sequence diagram illustrating a first operation of the arithmetic processing unit. The processor CPU_2 activates the process PR_0 to set the environment setting information (S20), and executes the process PR_0 (S21). When the instruction of the processing by the FPGA circuit is issued during the process PR_0, the processor CPU_2 outputs the processing execution request to the FPGA circuit (S22). To the processing execution request, the configuration data, the processing data, the request-source processor ID (CPU_ID), the invocation-source process ID (PR_ID), and the interrupt notification destination CPU information (CPU_2) are attached. In addition, the processor CPU_2 brings the process PR_0 into the wait state of the processing completion of the FPGA circuit (S23).

In response to the processing execution request, the FPGA circuit configures the operation circuit, sets the request-source processor ID (CPU_ID), the invocation-source process ID (PR_ID), and the interrupt notification destination CPU information (CPU_2) in the registers, and the operation circuit receives the processing data and executes the operation processing (S50, S51, and S52). Subsequently, when the processing is completed, the FPGA circuit transmits the processing completion notification to the processor CPU_2 via the processing completion notification signal line 15 (S56). In response to this, the processor CPU_2 resumes the execution of the process PR_0 (S24 and S25).

Figure 11:
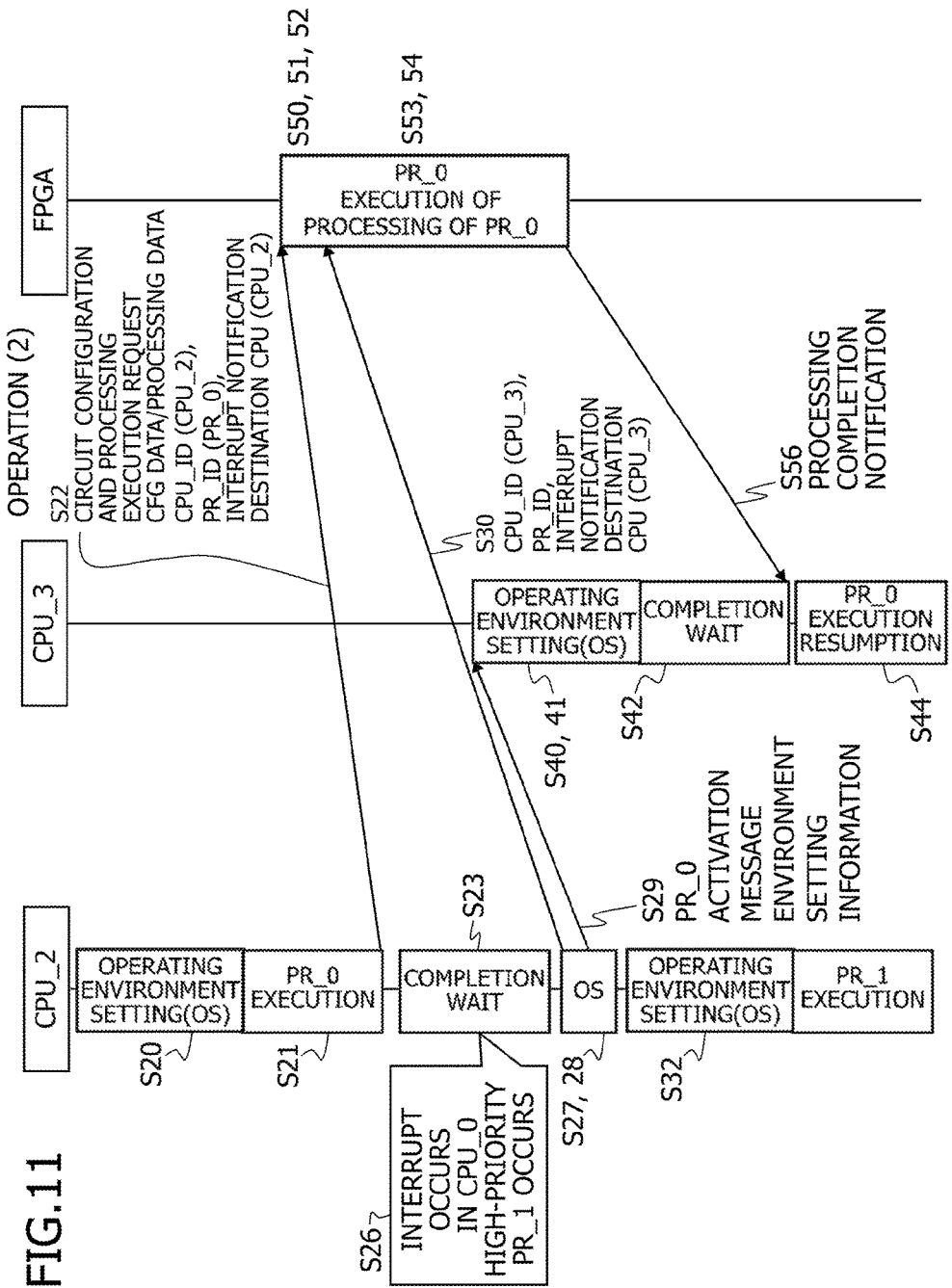
FIG. 11 is a sequence diagram illustrating a second operation of the arithmetic processing unit.

FIG. 11 is a sequence diagram illustrating a second operation of the arithmetic processing unit. The second operation corresponds to an example in which the interrupt occurs when the processor CPU_2 is in the wait state of the processing execution of the FPGA circuit, and the process PR_0 is moved to the processor CPU_3. The second operation is also performed in the case where the processing is not completed during the wait state of the processing completion of the FPGA circuit, the process PR_0 is suspended with the control based on the round-robin system, another process is activated, and the process PR_0 is moved to the processor CPU_3.

First, similarly to FIG. 10, the processor CPU_2 activates the process PR_0 to set the environment setting information (S20), executes the process PR_0 (S21), and outputs the processing execution request to the FPGA circuit (S22). Subsequently, the processor CPU_2 brings the process PR_0 into the wait state of the processing completion of the FPGA circuit (S23). In addition, the FPGA circuit configures the operation circuit, sets the request-source processor ID (CPU_ID) and the like in the registers, and the operation circuit receives the processing data and executes the operation processing (S50, S51, and S52).

Next, the interrupt occurs when the processor CPU_2 is in the wait state of the processing completion of the FPGA circuit (S26). In response to this, the OS of the processor CPU_2 ends the wait state of the processing completion of the process PR_0, saves the environment setting information in the memory (S27), and searches for the processor in the idle state (S28).

In the case where the processor CPU_3 in the idle state is found, the OS of the processor CPU_2 transmits the activation message of the process PR_0 to the processor CPU_3 (S29). In response to this, the processor CPU_3 activates the process PR_0 during the execution of the processing by the FPGA circuit, to set the environment setting information (S40 and S41). Subsequently, in the processor CPU_3, the process PR_0 is brought into the wait state of the processing completion of the FPGA circuit (S42).

In addition, the OS of the processor CPU_2 notifies the FPGA circuit of the movement-destination processor information (CPU_ID, CPU_3), the process information (PR_ID, PR_0), and the movement destination CPU information (S30). Then, the FPGA circuit sets these information sets in the registers (S53 and S54).

Lastly, the FPGA circuit completes the processing, and transmits the processing completion notification to the processor CPU_3 as the movement destination (S56). In response to this, the processor CPU_3 ends the processing wait state, and resumes the execution of the process PR_0 (S44). Since the process PR_0 is activated and the environment setting information is set during the processing of the FPGA circuit, when the processor CPU_3 as the movement destination receives the processing completion notification from the FPGA circuit, the processor CPU_3 resumes the execution of the process PR_0 immediately. With this, it is possible to prevent an increase in overhead time caused by the movement of the processor.

Figure 12:
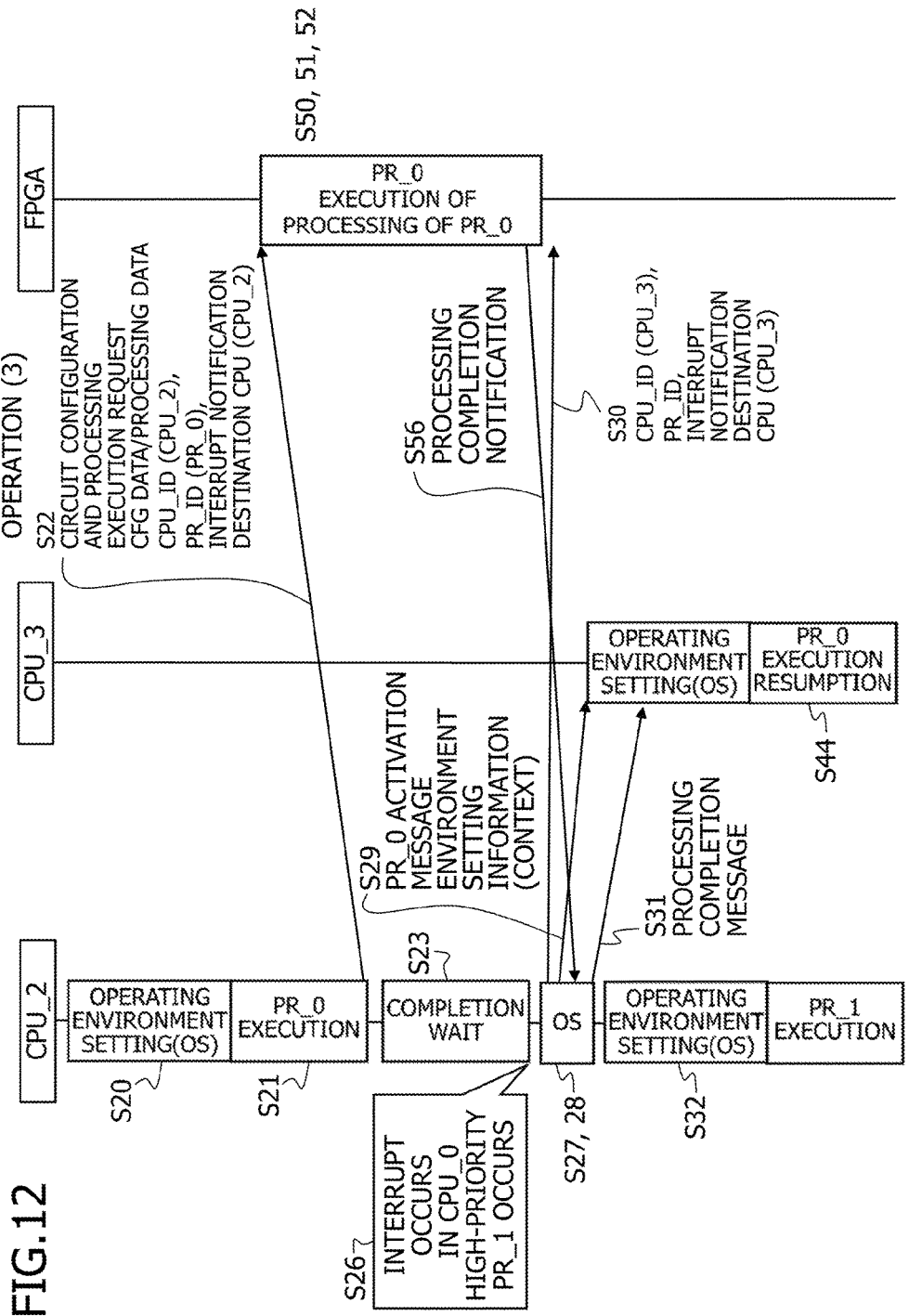
FIG. 12 is a sequence diagram illustrating a third operation of the arithmetic processing unit.

FIG. 12 is a sequence diagram illustrating a third operation of the arithmetic processing unit. In the third operation, when the interrupt has occurred in the case where the processor CPU_2 is in the wait state of the processing completion of the FPGA circuit in the second operation in FIG. 11, the notification of the movement-destination processor information and the like to the FPGA circuit by the processor CPU_2 (S30) and the notification of the processing completion to the processor CPU_2 by the FPGA circuit (S56) occur almost at the same time.

Accordingly, the OS of the processor CPU_2 as the movement source transmits the processing completion message to the movement-destination processor CPU_3 (S31). In response to this, the movement-destination processor CPU_3 resumes the execution of the process PR_0 (S44).

Second Embodiment

Figure 13:
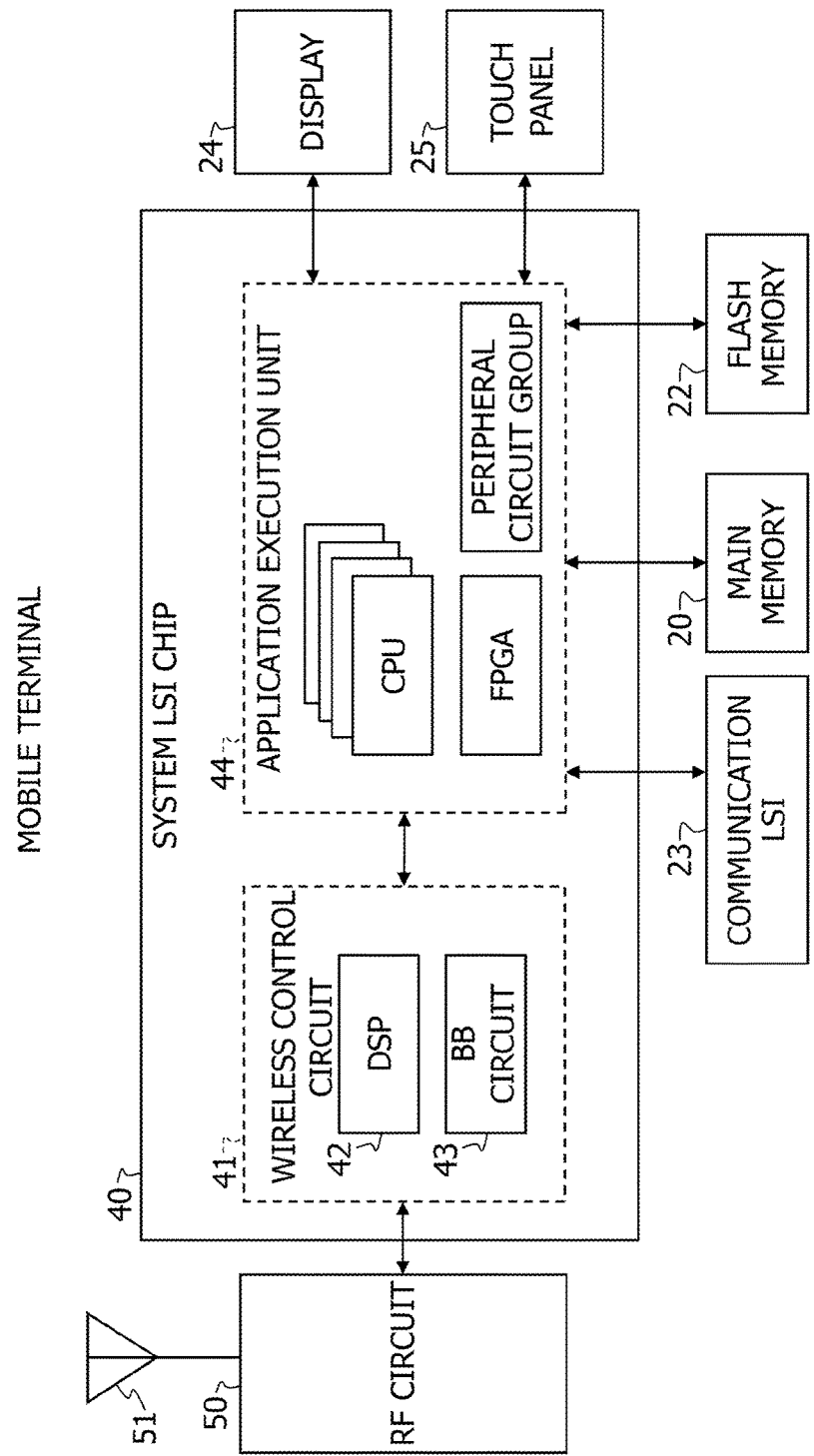
FIG. 13 is a view illustrating the configuration of a mobile terminal as an application example of the parallel processing device (arithmetic processing unit).

FIG. 13 is a view illustrating the configuration of a mobile terminal as an application example of the parallel processing device (arithmetic processing unit). The mobile terminal is a smart device such as a smartphone or a pad terminal. The mobile terminal has a system LSI chip 40 that has a wireless control circuit 41 and an application execution unit 44, an antenna 51, an RF circuit 50, a display 24, and a touch panel 25. Further, the mobile terminal has an LSI 23 for Bluetooth or WiFi, a main memory 20 capable of high-speed access such as a DRAM, and a large-capacity non-volatile auxiliary memory 22 such as a flash memory or a hard disk.

The wireless control circuit 41 has a baseband circuit 43 that performs various processing of a baseband signal, and a signal processing processor 42 that performs various signal processing.

The application execution unit 44 is the parallel processing device (arithmetic processing unit) of the present embodiment, and has a plurality of CPUs or CPU cores (processors), the FPGA circuit, and the peripheral circuit group. A plurality of the processors executes respective processes of a plurality of applications in parallel.

Figure 14:
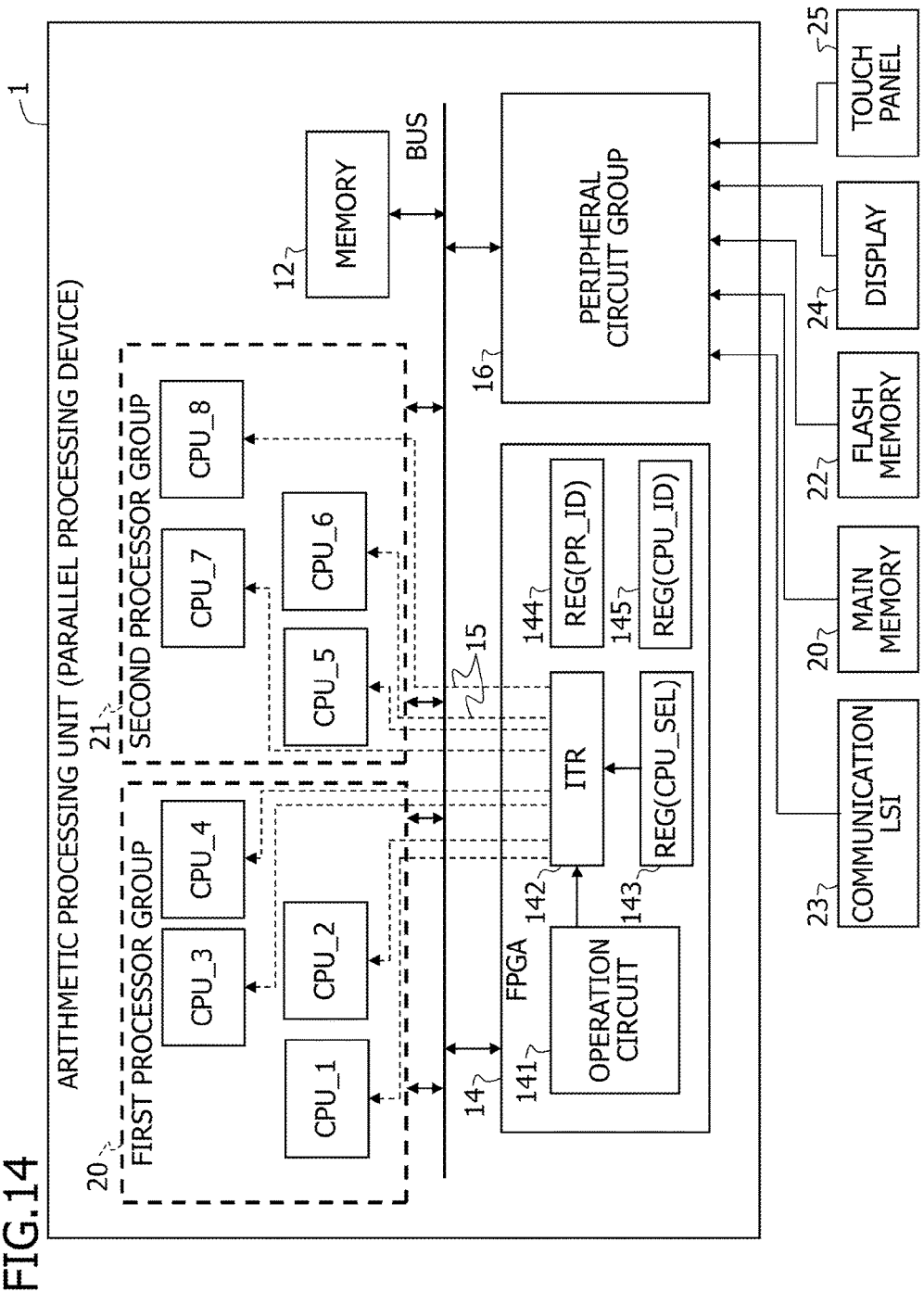
FIG. 14 is a view illustrating a configuration example of the parallel processing device (arithmetic processing unit) in a second embodiment.

FIG. 14 is a view illustrating a configuration example of the parallel processing device (arithmetic processing unit) in a second embodiment. The configuration in FIG. 14 different from that in FIG. 5 includes the configuration of a plurality of the processors and connection of the display 24 and the touch panel 25 to the peripheral circuit group 16.

In FIG. 14, the plurality of the processors are constituted by a first processor group 20 that has four processors CPU_1 to CPU_4, and a second processor group 21 that has four processors CPU_5 to CPU_8. The number of processors is only exemplary. Processes of the mobile terminal include the process in a wait state and the process currently being executed. The process in the wait state performs periodic communication or the like so that the processing amount thereof is small. Consequently, a low frequency clock is supplied to the first processor group 20. The processing amount of the process currently being executed is large, and a high frequency clock is supplied to the second processor group 21.

The processing completion notification signal lines 15 are provided between the FPGA circuit and the individual eight processors. The processing completion notification signal transmission circuit 142 of the FPGA circuit transmits the processing completion notification signal to the processor as the processing request source via the signal line 15 corresponding to the processor.

The peripheral circuit group 16 has driver circuits and input/output circuits that are connected to the communication LSI 23, the main memory 20, the auxiliary memory 22, the display 24, and the touch panel 25.

In the arithmetic processing unit in the second embodiment, similarly to the first embodiment, the plurality of the processors process the plurality of the processes in parallel. In addition, the processor executes the instruction code for requesting the processing by the FPGA circuit in the process to request the FPGA circuit to execute the processing. The method for assigning the process to the plurality of the processors, the method of the process request to the FPGA circuit, and the control method when the process is moved to the different processor during the processing by the FPGA circuit are the same as those in the first embodiment.

As described thus far, according to the present embodiment, in the parallel processing device in which the plurality of the processors perform the parallel processing of the plurality of the processes, in the case where, during the execution of the processing of part of the process by the FPGA circuit, the process is moved to another processor, the process is activated and the operating environment setting information is set by another processor as the movement destination during the processing of the FPGA circuit. With this, when the FPGA circuit completes the processing, the processor as the movement destination can resume the execution of the process immediately. Consequently, it is possible to reduce the overhead time.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A parallel processing device comprising:
   a plurality of processors that execute respective processes and cause a field programmable gate array (FPGA) circuit to process part of the processes, wherein
   a first processor of the plurality of processors requests the FPGA circuit to execute processing of part of a first process currently being executed by the first processor, when the first processor transitions to an execution of a second process, the first processor
   saves environment setting information including data stored in internal registers of the first processor,
   sends movement-destination processor information including an identifier of a movement-destination processor to the FPGA circuit, and
   causes the movement-destination processor to obtain the saved environment setting information for continuous processing of the first process, and
   the movement-destination processor
   performs setting the environment setting information in the movement-destination processor during the execution of the processing of the part of the first process by the FPGA circuit, and
   continues the processing of the first process based on the environment setting information in response to a processing completion notification from the FPGA circuit.

2. The parallel processing device according to claim 1, further comprising:
   the FPGA circuit that processes the part of the processes executed by at least one of the plurality of processors.

3. The parallel processing device according to claim 2, wherein
   the FPGA circuit sends the processing completion notification to the movement-destination processor of the movement-destination processor information.

4. The parallel processing device according to claim 2, further comprising:
   a plurality of processing completion notification signal lines that transmit the processing completion notification between the FPGA circuit and the plurality of processors, wherein
   the FPGA circuit transmits the processing completion notification via any of the plurality of the processing completion notification signal lines.

5. The parallel processing device according to claim 4, wherein
   the first processor sends information on a request-source processor to the FPGA circuit when the first processor requests the FPGA circuit to execute processing of part of the process currently being executed, and
   the first processor transfers the processing completion notification from the FPGA circuit to the movement-destination processor when the first processor initiates the execution of the second process.

6. The parallel processing device according to claim 1, wherein
   the first processor sends information on a request-source processor to the FPGA circuit when the first processor requests the FPGA circuit to execute the processing of the part of the first process, and transitions to a wait state of the processing completion of the FPGA circuit for a first predetermined time period.

7. The parallel processing device according to claim 6, wherein
   the first processor does not initiate the execution of the second process during the first predetermined time period.

8. The parallel processing device according to claim 1, wherein
   each of the plurality of processors repeatedly executes one process of the plurality of processes for a second predetermined time period and then executes another process for the second predetermined time period.

9. The parallel processing device according to claim 1, wherein
   each of the plurality of processors activates and executes, when the processor receives an interrupt signal during execution of any process, another process having a priority higher than a priority of the process currently being executed, and stops the execution of the process currently being executed.

10. The parallel processing device according to claim 1, wherein
the movement-destination processor transitions to a wait state of the processing completion of the FPGA circuit after completion of the setting of the environment setting information.

11. The parallel processing device according to claim 1, wherein
the first processor sends information on the first process to the FPGA circuit when the first processor requests the FPGA to execute the processing of the part of the first process.

12. A method of a parallel process of a parallel processing device including a plurality of processors that execute respective processes and cause a field programmable gate array (FPGA) circuit to process part of the processes, the method comprising:
  requesting, by a first processor of the plurality of processors, the FPGA circuit to execute processing of part of a first process currently being executed by the first processor;
  when the first processor transitions to an execution of a second process after the requesting,
    saving, by the first processor, environment setting information including data stored in internal registers of the first processor,
    sending, by the first processor, movement-destination processor information including an identifier of a movement-destination processor to the FPGA circuit, and
    causing, by the first processor, the movement-destination processor to obtain the saved environment setting information for continuous processing of the first process;
  performing, by the movement-destination processor, setting the environment setting information in the movement-destination processor during the execution of the processing of the part of the first process by the FPGA circuit; and
  continuing, by the movement-destination processor, the processing of the first process based on the environment setting information in response to a processing completion notification from the FPGA circuit.

\* \* \* \* \*